March 28, 1950     J. M. LOGGIE     2,502,014
OPTICAL COLOR COMPARISON APPARATUS
Filed Oct. 8, 1947     2 Sheets-Sheet 1
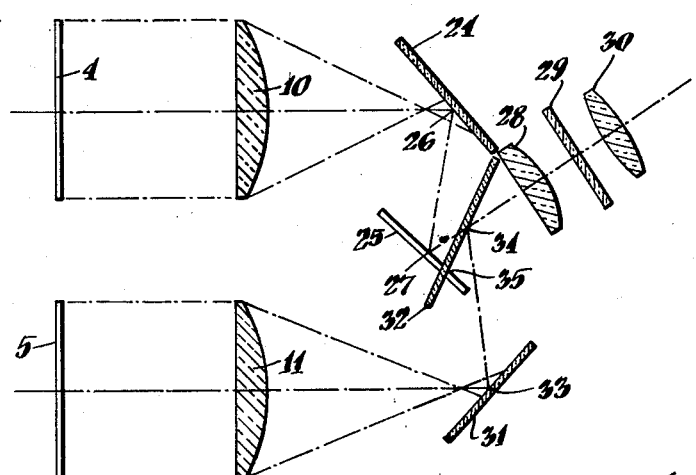
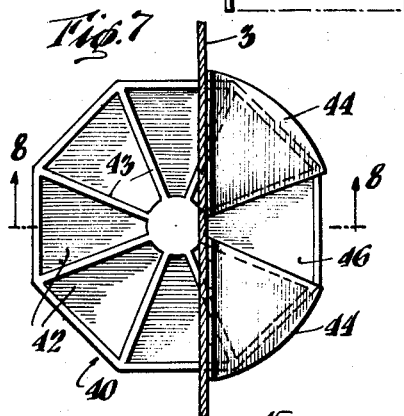
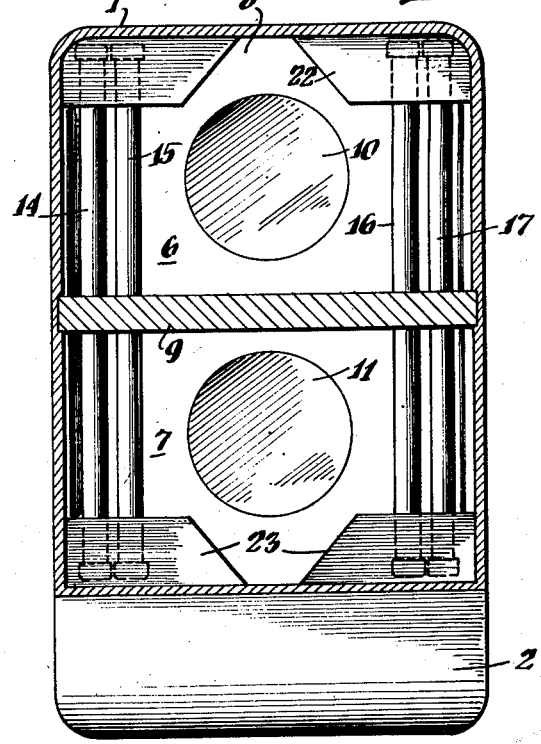
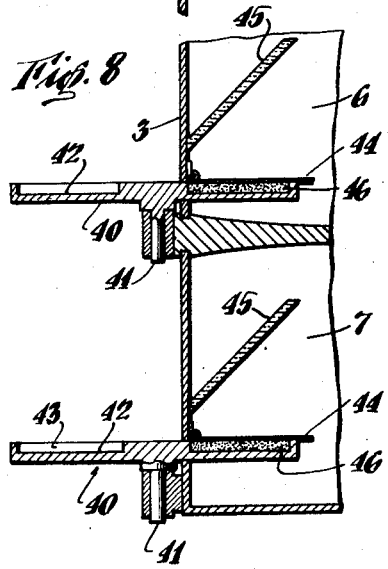
INVENTOR.
John M. Loggie
BY Robert S. Dunham
ATTORNEY March 28, 1950 J. M. LOGGIE 2,502,014
OPTICAL COLOR COMPARISON APPARATUS
Filed Oct. 8, 1947 2 Sheets-Sheet 2
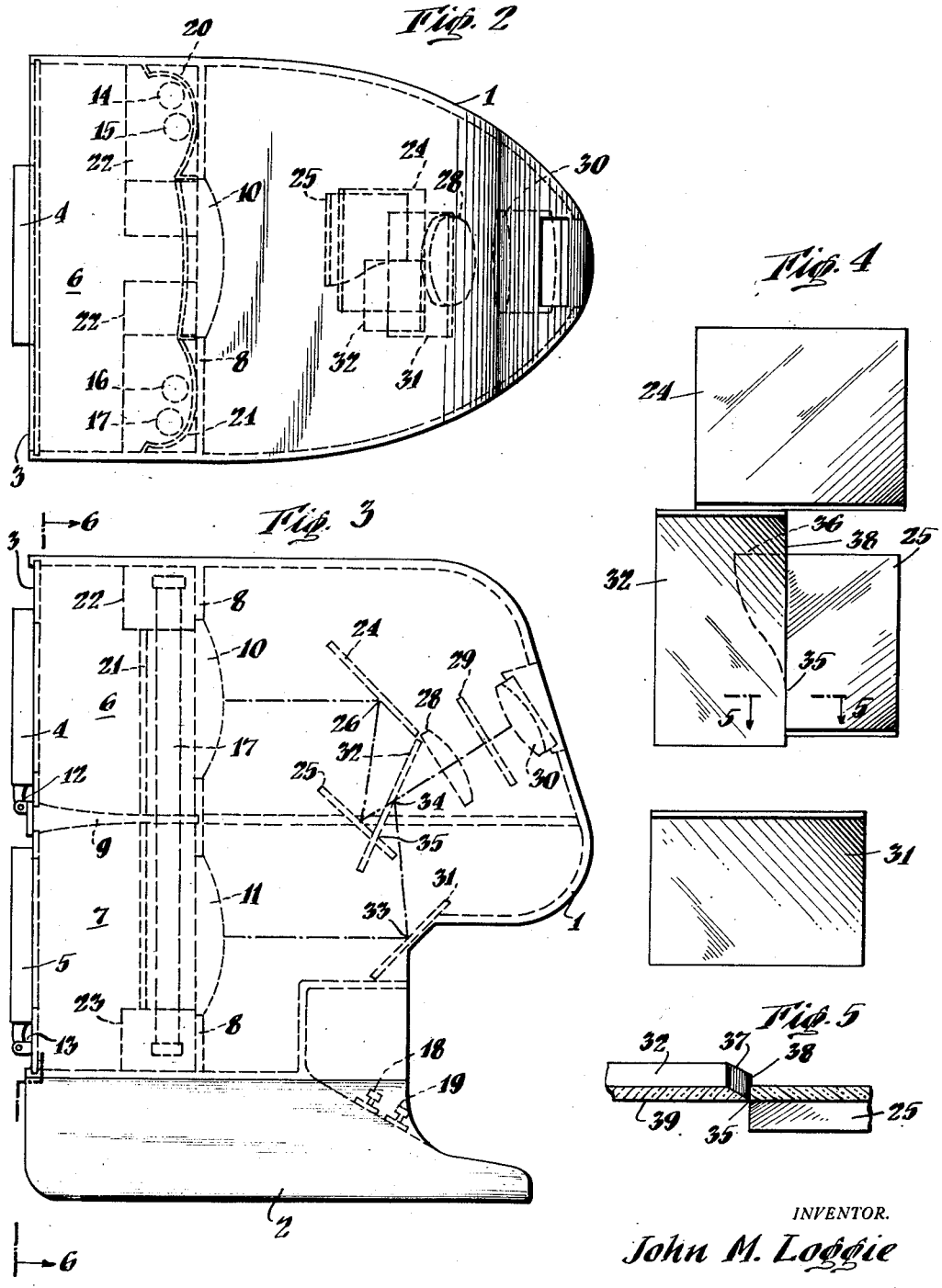
INVENTOR.
John M. Loggie
BY Robert S. Dunham
ATTORNEY Patented Mar. 28, 1950

2,502,014

UNITED STATES PATENT OFFICE 2,502,014

OPTICAL COLOR COMPARISON APPARATUS

John M. Loggie, Westport, Conn., assignor to John Robert Powers Products Co., Inc., New York, N. Y., a corporation of Delaware Application October 8, 1947, Serial No. 778,648

11 Claims. (Cl. 88—14)

My present invention relates to an optical color comparison apparatus and more particularly to an apparatus by which an accurate color comparison may be made by visual observation of a single viewing area having two portions, on one of which is projected a color characteristic of a sample the color of which is unknown and on the other, complementary and contiguous portion is projected a color characteristic of a known color standard.

Color comparison is important in many commercial fields at the present time as color has become a very important factor in the merchandising of many objects and things such as cloth in the piece or made up into articles of clothing, various materials such as paints, wall paper and upholstery materials, or other things used in interior decoration, cosmetics, which are preferably of a nature so as to blend properly with the skin coloration, and possibly also with types of clothing of the user and other fields too numerous to mention.

A principal object of the present invention, therefore, is to provide a practical, efficient and accurate color comparison apparatus by which the color of a material which may be unknown and the characteristics of which are desired to conform to a certain predetermined color standard may be compared with known color standards under conditions comparable to those under which the eventual use is to be made.

In the art of color comparison it has been found that many different factors affect the accuracy of color comparison, for example, the light to which a sample and a color standard are subjected must be known, or at least they must be examined in exactly the same color temperature. This cannot practically be effected by the ordinary use of daylight or of uncontrolled artificial light from extraneous sources, but must be carefully confined and controlled and the influx of all extraneous light prevented.

It has also been found that the distance between an object, the color of which is to be compared, and the viewing area and also the light transmission means including lens and/or mirror systems, must be exactly the same between the sample and the standard respectively, to the viewing area and hence to the eye of the observer. Even relatively slight differences in the lengths of the paths of light travel have been found to affect the color comparison, so that a sample which appears to be exactly like a standard under one set of conditions will appear different from it under another.

A further difficulty which has been found is that when too small samples or too small standards are used, the color comparison is wholly inaccurate. In this connection it has been found necessary that the sample and the standard have an area of at least one square inch and preferably more. The provision of an apparatus affording color comparison using larger size samples and standards is, therefore, a further object of the present invention.

A further object of the invention is to provide apparatus as aforesaid, wherein color comparison tests may be made using exactly the same known type of light and preferably also wherein selected different types of light may be used for comparing the same standard and sample, so as to obtain data as to the color comparison of the two under different light conditions, for example such as daylight, electric incandescent light, and possibly other types of light such as are used in department stores, in stage lighting, etc. In this connection it is essential and is an object of the invention to provide an apparatus by which all extraneous light, other than the light intended to be used, is precluded from contact with the standard and the sample during the comparing operation.

A further object of the present invention is to provide apparatus as aforesaid by which the color of a sample may be compared with a standard irrespective of the texture of the sample itself, for example, irrespective of a rough as against a smooth surface, or irrespective of the sample being in powder form while the standard may be a powder or be a properly colored sheet of paper or other material. In this connection also it is desired and is an object of the invention to provide apparatus by which the average color constant of a sample may be compared even though the sample may include portions having different colors such, for example, as a piece of cloth having different colored threads or having a pattern of some kind, the purpose being to obtain from the sample a diffused light, the color of which is characteristic of the average color constant of the sample and then to compare this average color constant with the average color constant of a standard.

Further and more detailed objects of the present invention include the provision of apparatus as aforesaid by which the length of the light paths from the sample and standard respectively to the viewing area are exactly similar, wherein the character of the illumination of the sample and standard is exactly the same, preferably by using the same light source to illuminate both standard and sample, and wherein the optical system intermediate the sample and standard respectively and the viewing area is similar, so as to preclude irregularities and errors in the comparison.

A further detailed object of the present invention is to provide a mirror system in an apparatus as aforesaid, which mirror system includes two mirrors disposed in planes at an angle to one another and such that the mirrors will intersect and touch one another at a point in a line which is the line of intersection of the planes thereof and wherein the point of intersection is out of the central portion of the light paths from the sample and standard respectively to the viewing area. In this connection it is an object to provide on the viewing area absolutely contiguous portions, without a line of demarcation therebetween, which portions are illuminated by light having colors respectively characteristic of the sample and standard, the elimination of the line of demarcation between the portions in the viewing area being one of the principal objects of the present invention. In attaining this object it has been found necessary that one of the mirrors of the two intersecting mirrors have a portion extending behind the other, considered from the direction along the path of light from the viewing area to the intersecting plane mirrors, so that the portion of one of these mirrors lying behind the other is more distant from the viewing area along the path of light than is the part of the other of the intersecting plane mirrors lying in front of the rearwardly disposed and laterally extending portion of the first named mirror.

Other objects and advantages of the present invention will become apparent from the following particular specification and appended claims, when considered in connection with the accompanying drawings, in which:

Figure 1 is a diagrammatic illustration showing the paths of light from the standard and sample respectively, and the elements of the lens and mirror system;

Fig. 2 is a view principally in plan of an apparatus in accordance with the present invention;

Fig. 3 is a view substantially in elevation of the apparatus shown in Fig. 2;

Fig. 4 is a fragmentary detailed view showing the arrangement of the mirrors in the mirror system as seen from the right in Fig. 3, the view being taken at substantially the angle of the eye of a person using the apparatus;

Fig. 5 is a fragmentary detailed view partly in section on the line 5—5 of Fig. 4;

Fig. 6 is a view substantially in vertical section on the line 6—6 of Fig. 3;

Fig. 7 is a fragmentary detailed view illustrating one of the trays for holding a liquid, pasty or pulverulent sample; and Fig. 8 is a fragmentary detailed view of a form of the invention shown in Fig. 7 taken substantially on the line 8—8 thereof.

In the accompanying drawings, and particularly in Figs. 1 to 6 thereof, there is shown a preferred embodiment of the invention, wherein a sample and a color standard may be exposed to the same light in respectively different light-separated compartments and light transmitted therefrom by reflection passed through a lens system and a mirror system, so that a viewing area will be illuminated on one side portion by a light characteristic of the color constant of the standard and on the other, complementary and contiguous portion, will be illuminated by a light having a color characteristic of the color constant of the sample. Provision is made for illuminating the standard and the sample by the same artificial and controllable light source, while excluding all extraneous light from both the sample and the standard. The light paths from the sample and the standard respectively to the viewing area are exactly similar to one another, so that the comparison will be accurate in every way; and provision is made for viewing a relatively large area, over one square inch and preferably up to a size of the order of magnitude of about ten square inches, so as to get an accurate color comparison. Provision is further made for "scrambling" the reflected light from the sample and from the standard, so that the light transmitted to the viewing area from the sample and standard respectively will each be a single uniform color, characteristic of an average color of the sample and standard respectively.

Turning now to Figs. 2, 3 and 6 of the accompanying drawings there is shown a housing 1 of suitable shape and contour having a base portion 2, which may be supported upon any suitable support, such as a table, stand or other means so as to be convenient to the user. The rear wall 3 of the housing is provided with a pair of openings, not particularly illustrated, which are covered by holders 4 and 5, these holders being used for the purpose, one for holding a suitable sample of material, the color of which is to be compared, and the other for holding a suitable color standard. Inasmuch as the holders and the light paths therefrom respectively to the viewing area are substantially similar as hereinafter more particularly set forth, it is immaterial which of the holders 4 and 5 is used for the standard and which for the sample. It is expected that in practice some one will usually be used for the standard and the other for the sample, according to the convenience of the operator. The holders 4 and 5 are suitably constructed and arranged so that the sample and standard will be retained in the same relative position in respect to the rear wall 3 of the housing 1, holders effective to this end being known in the art, so that the construction thereof is not particularly illustrated.

Inside the housing 1 the rear portion thereof is divided into an upper compartment 6 and a lower compartment 7, these compartments being formed by parts of the walls of the housing 1, an intermediate, substantially vertical wall 8 secured within the housing 1 and a horizontal dividing wall or baffle plate 9 dividing the compartments 6 and 7 from one another, so as to insure that the compartments are light-separated from each other. In the wall 8 is secured a plano-convex lens associated with each of the compartments 6 and 7 respectively and horizontally aligned with the center of the holders 4 and 5 in which the sample and standard are respectively adapted to be held. These lenses are numbered 10 and 11 for the compartments 6 and 7 respectively and constitute the first element of the respective lens systems and the only element of the lens system, as distinguished from the mirror systems hereinafter described, which are peculiar to the light paths individually. It will be understood that the lenses 10 and 11 are preferably identical with one another and that they are disposed with their plane side toward the source of the light passing therethrough, i. e. to the left as seen in Fig. 3.

While it is contemplated that the invention in its broader aspects could be used for comparing the colors of transparent or translucent material by transmitted light, the embodiments of the invention shown in the drawings use reflected light. To this end means are provided for illuminating both the sample and the standard from the same light source means and in the same manner, while excluding all extraneous light. As such the compartments 6 and 7 are completely closed to the outside during the normal use of the apparatus. The holders 4 and 5 are hinged to the rear wall of the compartments as shown at 12 and 13 respectively and are preferably spring-pressed to position or latched in position in a manner not particularly illustrated, but which will be obvious to those skilled in the art from the present description.

For illuminating the standard and sample there is preferably employed one or more elongate sources of light, so disposed as to extend into both compartments 4 and 5 so that, assuming, as is reasonable to do, that the amount of illumination is proportional to the length of the elongate light source exposed to the interior of the compartments respectively, the illumination can be made uniform by exposing exactly the same length of a light source in each compartment. In the preferred form of the present invention this illumination is effected by one or more fluorescent tubes, such as are now commonly in use for many lighting purposes, the arrangement being such that the same length of each tube used is exposed simultaneously in the compartments 6 and 7.

In order that the light be uniform on all portions of the standard and sample respectively, the fluorescent tubes employed and which are shown at 14, 15, 16 and 17 are vertically disposed, extend entirely through both compartments, and are uniformly disposed in respect to the standard and sample and also in respect to the light paths therefrom through the lenses 10 and 11.

It is normally preferred to use two lights of the same color and characteristics simultaneously. Thus the lights 15 and 16 may be considered a pair for simultaneous use and the lights 14 and 17 another pair for simultaneous use alternatively with the pair of lights 15 and 16. It will be understood that while but one pair of lights such as 15 and 16 may be used, it may and often is desirable to make a comparison of colors under different light conditions. Thus, for example, the pair of lights 15—16 may be of a character or color temperature to simulate daylight, while the pair of lights 14 and 17 may be of a character or color temperature to simulate electric incandescent lighting. Other types of lighting may be employed by using suitable sources of light having desired light characteristics.

The means normally associated with fluorescent type lights for providing the necessary type of electric energy thereto may be located within the base 2 or at any other suitable part of the apparatus, and suitable switches such, for example, as those shown diagrammatically at 18 and 19 may be provided at a position convenient to the operator for turning on and off each set of lights. While there are but two pairs of lights here shown, it will be understood that any desired number of sets of lights may be employed in accordance with the desires of the persons constructing the apparatus in accordance with the present invention.

The inside of the compartments 6 and 7 may be made any desired color, for example, a white which will not absorb any large proportion of the light supplied to the compartment, so that adequate lighting may be effected. Suitable means such as reflectors shown at 20 and 21 may be disposed in rear of the light sources 14 to 17 as shown for the usual purpose.

Due to the construction of fluorescent lights as tubular bodies coated on the inside of the tubes with a chemical material which glows during the operation of the light, it sometimes happens that some of this inside coating becomes detached from the inside of the tube and falls down to one end thereof. If this end portion were therefore exposed to the inside of the compartments 6 or 7, particularly compartment 7, the illumination from the portion in part filled with fallen chemical material would be less than that of other portions of the light tubes. In order to prevent inequality in lighting due to this cause, shields or housings shown at 22 and 23 are provided at the upper end portions of the compartment 6 and the lower end portions of the compartment 7 respectively, so as to block off the end portions of the light tubes from the inside of the compartments, leaving the portions of the light tubes exposed to the interior of the compartments as those portions which will not differ from one another.

Turning now to the light path from the sample and standard respectively to the viewing area and considering particularly diagrammatic Fig. 1 and also Fig. 3, light from the sample or standard, whichever it may be, held in the holder 4, passes thence horizontally through the lens 10 to and is reflected by a plane mirror 24. This light is reflected from this mirror in a generally downward direction to a mirror 25 and is thereby reflected through the final lens system to the viewing area. The arrangement of the mirrors 24 and 25 is such that a line from the center of the standard or sample in the holder 4 passing through the center of the lens 10 horizontally will be reflected by the mirror 24 and the mirror 25 to the center of the viewing area hereinafter described. This line passes through the points 26 on the mirror 24 and 27 on the mirror 25 and thence through the center line of the common lens system which includes a light gathering lens 28, a translucent screen 29 and a lens 30. I have found, however, that the use of a translucent screen, while sometimes desirable, may be dispensed with and clear lenses only used, such as the lenses 28 and 30, for direct observation.

In a similar manner light from a standard or sample, whichever it may be, held in the holder 5 will pass through the lens 11 and be reflected first from a plane mirror 31, thence from a plane mirror 32 through the final common lens system, 28, 29 and 30. In a similar way light from the center of the standard or sample in the holder 5 will pass horizontally and centrally through the lens 11 to a point 33 on the mirror 31 thence to a point 34 on the mirror 32 which is on the center line of the lens system 28, 29, 30 and in alignment with the point 27.

In order that the comparison provided by the apparatus of this invention be exactly accurate, the distance from a standard or sample in the holder 4 to the screen 29 along the light path just traced is preferably made exactly the same as the distance from a standard or sample in the holder 5 along its light path to the same screen 29, the greater distance between the points 27 and 34 of the upper light path being compensated for by a correspondingly greater distance from the lens 11 to the point 33 than from the lens 10 to the point 26. In this way the light paths may be made exactly the same in length and essentially similar in character, so that accurate color comparison is possible. The distance between the points 26 and 27 may be assumed to be the same as the distance between the points 33 and 34. However, if these last distances are different in any respect, this difference may be compensated for by the difference provided between the distance from the lens 10 to the point 26 and the distance from the lens 11 to the point 33.

The mirrors 24, 25, 31 and 32 are preferably all front surface mirrors, although this is not essential in respect to the mirrors 24 and 31 as it is in respect to the mirrors 25 and 32 for reasons which will hereinafter appear.

It will be understood in practice that the mirrors 24—25, 31—32 and the lens means 28, 29 and 30 are all preferably supported in a suitable fixed support, which in turn is secured to the housing 1, this support not being shown in the accompanying drawings in order that the details of the mirror and lens arrangements may be clearly illustrated.

In order that the light from the sample and standard respectively be properly transmitted to the viewing area comprising the screen 29 with or without the lens 30 and that the areas illuminated by the standard and sample be exactly complementary and contiguous in the viewing area without a perceptible line of demarcation therebetween, the arrangement of the mirrors 25 and 32 is critical. These mirrors are disposed as shown in planes at an angle to one another, which planes (of the front reflecting surfaces) intersect at the point 35, see Figs. 3, 4 and 5. It has been found desirable, if not absolutely necessary, that the point 35 to be disposed out of the principal path of light, so that this point as shown is disposed below the center portions of the path of light illustrated by the line including points 27 and 34. It has also been found necessary, in order to eliminate the line of demarcation between the respective portions of the viewing area, that that portion of the mirrow (here mirror 25) which is disposed in rear of the other mirror (here mirror 32) and futher from the viewing area (screen 29) in a direction along the path of light thereto, be extended laterally in rear of the other mirror. To this end the mirror 25, which has its effective portion in rear of the mirror 32, considered from the point of view of the viewing area, is arranged to extend laterally as shown in dotted lines in Fig. 4 at 36 in the rear of the mirror 32. This is effected practically by forming the mirror 25 as a harp-shaped mirror and having the point 35 in the line of intersection of the planes of the reflecting surfaces of the mirrors 25 and 32 disposed at a narrow portion of the harp-shape, the wider portion shown at 36 in Fig. 4 extending to the rear of the mirror 32. This effect is also furthered by forming the mirrors 25 and 32 as front surface mirrors and by beveling the edge of the mirror 32 which engages the mirror 25 at 35 as shown at 37 in Fig. 5, so that the right-hand edge of the mirror 32 as seen in Figs. 4 and 5 and illustrated at 38 is a sharp or razor edge, which lies in the plane of the forward or reflecting surface 39 of the mirror 32.

By these provisions it has been found possible when comparing a sample and standard, which are in fact of the same color, to project upon the viewing area light which has no perceptible line of demarcation from one side portion to the other; and at the same time it has been found possible in comparing colors, which are but slightly different from one another, to bring these colors into exact contiguity on the viewing area in a manner such that a person of normal color perception will be enabled easily to detect the difference. This advantageous result of the present invention is not possible where there is any substantial line of demarcation perceptible to an observer between the areas respectively illuminated by the colors of the sample and the standard.

As the apparatus of the present invention is designed to be independent of texture characteristics or mixtures of color in a sample, the color of which is to be analyzed, it is necessary that the light from such a sample be "scrambled," so that the color of the light projected on the viewing area is a mean average or color constant of the color of the sample, rather than a clear image showing thereof. For this purpose the dimensions of the apparatus are such in respect to the focal length of the lenses 10 and 11 that an out-of-focus relationship exists and only an average or color constant of the color of a sample is projected upon the viewing area. This effect is also furthered by using a translucent screen as a viewing area, rather than by using a clear lens means. In order that the comparison may be truly accurate and so that the holders 4 and 5 may be used interchangeably, both lens systems are similar in this respect.

As it has been found in the past that color comparison when attempted upon a sample or a standard of very small size, such for example as an area of the order of magnitude of one-half a square inch, is subject to substantial inaccuracies, the present apparatus provides for the use of samples and standards having substantial size areas, so as to afford an accurate color comparison. These areas in practice are preferably greater than one square inch and up to as much as an area of the order of magnitude of ten square inches or more. This large area can be used due to the substantial size of the holders 4 and 5 and of the lenses 10 and 11.

While it is contemplated that the apparatus of the present invention may be used to compare a standard with a sample which is in the form of a panel or sheet of some material, the color of which is to be compared with a standard, it is also contemplated that the color of the skin of a living person may be compared with one or more different standards for the purpose of matching cosmetics to the color characteristics of a person's skin. For this purpose one of the holders, for example the holder 4, may be swung to one side and if desired completely removed; and a person may hold some part of his body against the aperture of compartment 6 normally closed by the holder 4, the comparison then proceeding in the normal manner. This is one particular adaptation contemplated for the device of the present invention and which is to be considered within the scope of the claims thereof.

Turning now to Figs. 7 and 8, means are provided for comparing the colors of material which do not lend themselves to being adequately supported in holders such as 4 and 5 shown in Figs. 2 and 3. Such materials might, for example, include liquids, pulverulent materials, pasty materials and others which will occur to those skilled in the art. For this purpose either or both of the compartments 6 and 7 may be provided as shown in Figs. 7 and 8 with tray means shown at 40, which are mounted for rotation about vertical axis pintles 41 swiveled in suitable brackets carried by the rear wall 3 of the housing 1. Each tray is arranged with a plurality of sector shaped compartments 42 divided by radial partitions 43 as shown. A suitable slot of the necessary size and disposition is provided in the rear wall 3 of the housing 1 to permit the introduction of one side portion of each tray; and shield portions 44 may be provided associated with the rear wall 3 of the housing to cover over all but one of the compartments 42, so as to expose the material therein to light within the compartments 6 or 7 or both. Inasmuch as the trays are substantially horizontally disposed, it is necessary that an additional mirror such as shown at 45 be provided at substantially a 45° angle with the horizontal, so as to reflect the light from the material within the compartment 42 in the operative position, shown at the right in Fig. 8 at 46 to the ordinary light path through the lenses 19 and 11 as aforesaid.

By using a tray such as shown at 40 and the other arrangements just described in but one of these compartments and a holder as shown at 4 or 5 associated with the other it is posible to compare material which must be held in a tray as at 40 with a color standard consisting of a sheet or panel of suitable material colored to a predetermined color. At the same time by using two trays as shown in Fig. 8, two materials, both, for example, of a pulverulent nature, may be compared with one another as to color. Any combination of these type holders which may be needed for any particular purpose may be used in accordance with the present invention.

While there is illustrated in the accompanying drawings and herein particularly described but one principal embodiment of the invention and a modification of but one portion thereof, other variants will occur to those skilled in the art and are included within the scope of the appended claims, which are to be construed validly as broadly as the state of the prior art permits.

What is claimed is:

1. Color comparison apparatus, comprising a housing provided with two similar compartments, in one of which a color standard may be exposed and in the other, a color sample to be compared therewith, means for similarly illuminating the sample and the standard with the same light by providing as a part of said apparatus a common lighting means for said sample and said standard arranged to illuminate each in the same manner, and means excluding all extraneous light from any other light source, a single viewing area including one field portion adapted to be illuminated by light from the standard and an exactly complementary and contiguous field portion adapted to be illuminated by light from the sample, similar lens means in the paths of light from the sample and the standard respectively to said viewing area, and a system of plane mirrors for directing light from the sample and standard respectively to said viewing area, said system of mirrors including a mirror for the sample and standard respectively, having their reflecting surfaces at an angle to one another, and both arranged in alignment with laterally contiguous portions of a single path of light en route to said viewing area, the reflecting surfaces of these two mirrors touching one another at a predetermined point out of alignment with said single path of light, the one of said two mirrors having its portion which is further from said viewing area in a direction along the path of light thereto extending laterally in rear of the other of said two mirrors, and a light gathering lens intermediate said mirrors and said viewing area, so as to present to the viewing area exactly complementary and contiguous illuminated field portions characteristic of the sample and standard respectively, and with no perceptible dividing line therebetween.

2. Color comparison apparatus in accordance with claim 1, wherein said sample and said standard are both similarly illuminated by reflected light.

3. Color comparison apparatus in accordance with claim 1, wherein means are provided for light-separating said two similar compartments and wherein the means for illuminating the sample and the standard with the same light comprises at least one elongate light source having portions extending similarly into each of said compartments, so that the illumination of both the standard and the sample is effected by light of the same characteristics.

4. Color comparison apparatus in accordance with claim 1, wherein means are provided for light-separating said two similar compartments, and wherein the means for illuminating the sample and the standard with the same light comprises two elongate electric fluorescent light sources, each similarly extending through both of said compartments and both uniformly and symmetrically disposed in respect to said compartments and the standard and sample respectively and also symmetrically disposed as to the light paths from the sample and standard respectively through said lens means.

5. Color comparison apparatus, comprising a housing provided with two similar compartments disposed one above the other, in one of which a color standard may be exposed and in the other a color sample to be compared therewith, said standard and sample being disposed in a rear vertical wall of said compartments, a pair of similar elongate light sources each extending vertically through both said compartments adjacent to a forward wall thereof and disposed similarly one on either side of the center of the forward portion of said compartments, said light sources being exposed to the interior of said compartments to substantially the same extent, so as to illuminate the standard and sample similarly by the same kind of light, means closing said compartments to all extraneous light except that from said light sources, a single viewing area including one field portion adapted to be illuminated by light from the standard and a complementary and contiguous field portion adapted to be illuminated by light from the sample, similar lens means in the paths of light from the sample and the standard respectively to said viewing area, a system of plane mirrors for directing light from the sample and standard respectively to said viewing area, said system of mirrors including a mirror for the sample and standard respectively, which have their reflecting surfaces at an angle to one another, and both of which are arranged in alignment with laterally contiguous portions of a single path of light en route to said viewing area, the reflecting surfaces of these two mirrors touching one another at a predetermined point out of alignment with said single path of light, and the one of said two mirrors having its portion which is further from said viewing area in a direction along the path of light thereto extending laterally in rear of the other of said two mirrors, and a light gathering lens intermediate said mirrors and said viewing area, so as to present to the viewing area complementary and contiguous illuminated field portions characteristic of the sample and standard respectively and with no perceptible dividing line therebetween.

6. Color comparison apparatus in accordance with claim 5, wherein said light sources each comprise an elongate fluorescent type electric lamp vertically disposed in and extending completely through both said compartments, and means associated with said compartments for shielding the extreme upper and lower ends of said light sources, so that the light transmitted to said compartments is unimpaired by any material which may fall inside said light sources and diminish the light intensity at the lower end portions thereof.

7. Color comparison apparatus in accordance with claim 5, wherein said light sources comprise similar pairs of light sources having respectively different light characteristics for each pair, and wherein each light source of each of said pairs similarly extends through both said compartments, whereby to afford a comparison of the color of the standard with that of the sample under selected different light conditions.

8. Color comparison apparatus in accordance with claim 1, wherein each of said similar lens means is arranged in a predetermined out-of-focus relationship between the standard and sample respectively and the viewing area, so that the light transmitted to the viewing area from the standard and sample respectively is diffused and has an average color constant corresponding to the average color of the standard and sample respectively, while being independent of color differences in different parts of the standard and sample and variations in the texture thereof.

9. Color comparison apparatus, comprising a housing provided with two similar compartments, in one of which a color standard may be exposed and in the other, a color sample to be compared therewith, means for similarly illuminating the sample and the standard with the same light by providing as a part of said apparatus a common lighting means for said sample and said standard arranged to illuminate each in the same manner, and means excluding all extraneous light from any other light source, a single viewing area including one field portion adapted to be illuminated by light from the standard and an exactly complementary and contiguous field portion adapted to be illuminated by light from the sample, similar lens means in the paths of light from the sample and the standard respectively to said viewing area, a system of plane mirrors for directing light from the sample and standard respectively to said viewing area, said system of plane mirrors including a pair of mirrors having their reflecting surfaces disposed in planes at an angle to one another and which planes intersect on a line out of the light paths between the sample and standard and the viewing area, one mirror of said pair being substantially harp-shaped and having a portion of its curved edge at a narrow part of the harp-shape of the mirror engaging an edge of the other mirror of this pair in said line of intersection of the planes of said mirrors, the wider portion of the harp-shaped mirror extending in rear of the other mirror of this pair, so as to be further from the viewing area in a direction along the path of light thereto, and a light gathering lens intermediate said mirrors and said viewing area, so as to present to the viewing area exactly complementary and contiguous illuminated field portions characteristic of the sample and standard respectively, and with no perceptible dividing line therebetween.

10. Color comparison apparatus in accordance with claim 9, wherein each of said pair of mirrors which intersect one another is a front surface mirror, and wherein the second named mirror of this pair has its edge which is in contact with said harp-shaped mirror formed as a sharp edge lying in the front reflecting surface thereof by a rearwardly directed bevel.

11. Color comparison apparatus in accordance with claim 1, comprising in addition, a movable tray means accessible from the exterior of the apparatus and arranged to be introduced thereinto in a predetermined position in respect to one of said compartments, for holding liquid, pasty and pulverulent materials, the color of which is to be compared, said tray means comprising a plurality of sector-shaped tray compartments, means for supporting each of said tray means for rotation about a vertical axis exteriorly of said apparatus, said axis and the dimensions of said tray compartments being such that one sector-shaped compartment of said tray means is at all times disposed inside said apparatus, and separators between the sector-shaped compartments of said tray means cooperating with light shield means in the associated light-separated compartment of said apparatus.

JOHN M. LOGGIE.

REFERENCES CITED

The following references are of record in the file of this patent:

UNITED STATES PATENTS

| Number | Name | Date |
|---|---|---|
| 1,849,607 | Bernheim | Mar. 15, 1932 |
| 2,196,234 | Townsend | Apr. 9, 1940 |
| 2,427,256 | Butscher | Sept. 9, 1947 |

FOREIGN PATENTS

| Number | Country | Date |
|---|---|---|
| 440,720 | Germany | Feb. 12, 1927 |
| 460,587 | Germany | June 5, 1928 |